US 12,478,932 B2

United States Patent
Marra

(10) Patent No.: US 12,478,932 B2
(45) Date of Patent: Nov. 25, 2025

(54) PORTABLE PREPARATION ASSEMBLY AND METHOD TO PREPARE LIQUID COSMETIC/CLEANSER PRODUCTS

(71) Applicant: CORAL S.R.L., Volturara Irpina (IT)

(72) Inventor: Alessandro Marra, New York, NY (US)

(73) Assignee: CORAL S.R.L., Volturara Irpina (IT)

( * ) Notice: Subject to any disclaimer, the term of this patent is extended or adjusted under 35 U.S.C. 154(b) by 285 days.

(21) Appl. No.: 17/793,486

(22) PCT Filed: Jan. 15, 2021

(86) PCT No.: PCT/IB2021/050301
§ 371 (c)(1),
(2) Date: Jul. 18, 2022

(87) PCT Pub. No.: WO2021/144757
PCT Pub. Date: Jul. 22, 2021

(65) Prior Publication Data
US 2023/0083963 A1 Mar. 16, 2023

Related U.S. Application Data

(60) Provisional application No. 62/962,564, filed on Jan. 17, 2020.

(30) Foreign Application Priority Data

Nov. 4, 2020 (IT) ........................ 102020000026299

(51) Int. Cl.
*B01F 27/88* (2022.01)
*A45D 34/00* (2006.01)
(Continued)

(52) U.S. Cl.
CPC .............. *B01F 27/88* (2022.01); *A45D 34/00* (2013.01); *B01F 21/10* (2022.01); *B01F 23/53* (2022.01);
(Continued)

(58) Field of Classification Search
CPC ........ B01F 27/88; B01F 33/452; B01F 21/10; B01F 35/2136; B01F 33/5014;
(Continued)

(56) References Cited

U.S. PATENT DOCUMENTS

| 1,460,704 A | 7/1923 | Celler |
| 2013/0146486 A1* | 6/2013 | Justus ................... B65D 81/32 206/220 |

(Continued)

FOREIGN PATENT DOCUMENTS

| CN | 105433808 A | 3/2016 |
| WO | 2017/219120 A1 | 12/2017 |

OTHER PUBLICATIONS

International Search Report and Written Opinion dated Jul. 1, 2021 from corresponding International Patent Application No. PCT/IB2021/050301, 19 pages.

*Primary Examiner* — Jacob K Ackun
(74) *Attorney, Agent, or Firm* — Ruggiero McAllister & McMahon LLC

(57) ABSTRACT

A portable preparation assembly to prepare liquid cosmetic/cleanser products in a personalised way has a container which is configured to contain a solvent liquid and includes a base wall, a lateral wall and an upper opening opposite to the base wall; a housing seat configured to house a solid cosmetic/cleanser and arranged at least partially inside the container; and a stirring device which is configured to stir the solvent liquid in the container so as to determine at least partial dissolution of the solid cosmetic/cleanser in the (Continued)

solvent liquid and mix the dissolved solid cosmetic/cleanser with the solvent liquid to obtain the liquid cosmetic/cleanser product.

17 Claims, 9 Drawing Sheets

(51) Int. Cl.
| | |
|---|---|
| *B01F 21/10* | (2022.01) |
| *B01F 23/50* | (2022.01) |
| *B01F 23/53* | (2022.01) |
| *B01F 31/85* | (2022.01) |
| *B01F 31/86* | (2022.01) |
| *B01F 33/452* | (2022.01) |
| *B01F 33/501* | (2022.01) |
| *B01F 35/21* | (2022.01) |
| *B01F 35/22* | (2022.01) |
| *B01F 35/71* | (2022.01) |
| *B01F 35/92* | (2022.01) |
| *A47K 5/12* | (2006.01) |
| *B01F 35/90* | (2022.01) |
| *B01F 101/21* | (2022.01) |
| *B01F 101/24* | (2022.01) |

(52) U.S. Cl.
CPC ............ *B01F 23/551* (2022.01); *B01F 31/85* (2022.01); *B01F 31/86* (2022.01); *B01F 33/452* (2022.01); *B01F 33/5014* (2022.01); *B01F 35/2115* (2022.01); *B01F 35/2117* (2022.01); *B01F 35/2132* (2022.01); *B01F 35/2136* (2022.01); *B01F 35/2205* (2022.01); *B01F 35/2209* (2022.01); *B01F 35/7162* (2022.01); *B01F 35/92* (2022.01); *A45D 2200/055* (2013.01); *A45D 2200/058* (2013.01); *A47K 5/1207* (2013.01); *B01F 2035/99* (2022.01); *B01F 2101/21* (2022.01); *B01F 2101/24* (2022.01)

(58) Field of Classification Search
CPC .............. B01F 35/2209; B01F 35/2117; B01F 35/7162; B01F 35/92; B01F 35/2115; B01F 23/551; B01F 31/85; B01F 31/86; B01F 23/53; B01F 35/2132; A45D 34/00
USPC ........................................................ 206/219
See application file for complete search history.

(56) References Cited

U.S. PATENT DOCUMENTS

| | | | |
|---|---|---|---|
| 2015/0158654 A1* | 6/2015 | Petrov | ................. B01F 33/5011 206/219 |
| 2015/0374175 A1 | 12/2015 | Garr | |
| 2020/0189827 A1 | 6/2020 | Jeong et al. | |

\* cited by examiner

PORTABLE PREPARATION ASSEMBLY AND METHOD TO PREPARE LIQUID COSMETIC/CLEANSER PRODUCTS

CROSS-REFERENCE TO RELATED APPLICATIONS

This patent application is a national stage application under 35 U.S.C. § 371, of PCT/IB2021/050301 filed on Jan. 15, 2021 and claims priority from U.S. Patent Application No. 62/962,564 filed on Jan. 17, 2020 and from Italian Patent Application No. 102020000026299 filed on Nov. 4, 2020, the entire content all of which is incorporated by reference herein in their entirety.

BACKGROUND OF THE DISCLOSURE

1. Field of the Disclosure

The present invention concerns a portable preparation assembly and a preparation method to prepare liquid cosmetic/cleanser products in a personalised manner.

In particular, the present invention refers to a preparation assembly to prepare liquid cleaning solutions like shampoo, conditioner, liquid body soap, liquid hand soap, washing-up liquid, etc.

2. Description of the Related Art

As is known, liquid cosmetic/cleanser products are generally contained in disposable plastic containers for ease of sale and distribution.

Over the last decades, growing attention to the reduction of global pollution has led to constant efforts to reduce the consumption of plastic. In this context, elimination or reduction of the plastic materials used for packaging liquid cosmetic/cleanser products has become a need of primary importance.

SUMMARY

One object of the present invention is to provide a portable preparation assembly to prepare liquid cosmetic/cleanser products that mitigates the drawbacks of the known art.

In particular, one object of the present invention is to provide a preparation assembly that reduces the consumption of plastic.

According to the present invention, a portable preparation assembly is provided to prepare liquid cosmetic/cleanser products in a personalised manner as defined in the claims.

Thanks to the present invention, it is possible to store and distribute only the solid cosmetic/cleanser, avoiding packaging of the liquid cosmetic/cleanser product in disposable plastic containers.

Furthermore, it is possible to prepare a plurality of different liquid cosmetic/cleanser products inside the same container and in a personalised manner, according to specific user requirements.

A further object of the present invention is to provide a method for preparing liquid cosmetic/cleanser products in a personalised manner that mitigates at least one of the drawbacks of the known art.

In accordance with the present invention, a method to prepare liquid cosmetic/cleanser products in a personalised manner is provided as defined in the claims.

Thanks to the present method, it is possible to personalize preparation of the liquid cosmetic/cleanser product and reduce to zero the consumption of plastic for storage and distribution of the liquid cosmetic/cleanser product.

BRIEF DESCRIPTION OF THE DRAWINGS

Further characteristics and advantages of the present invention will appear clear from the following description of a non-limiting embodiment example, with reference to the attached Figures, in which.

DETAILED DESCRIPTION

Figure 1:
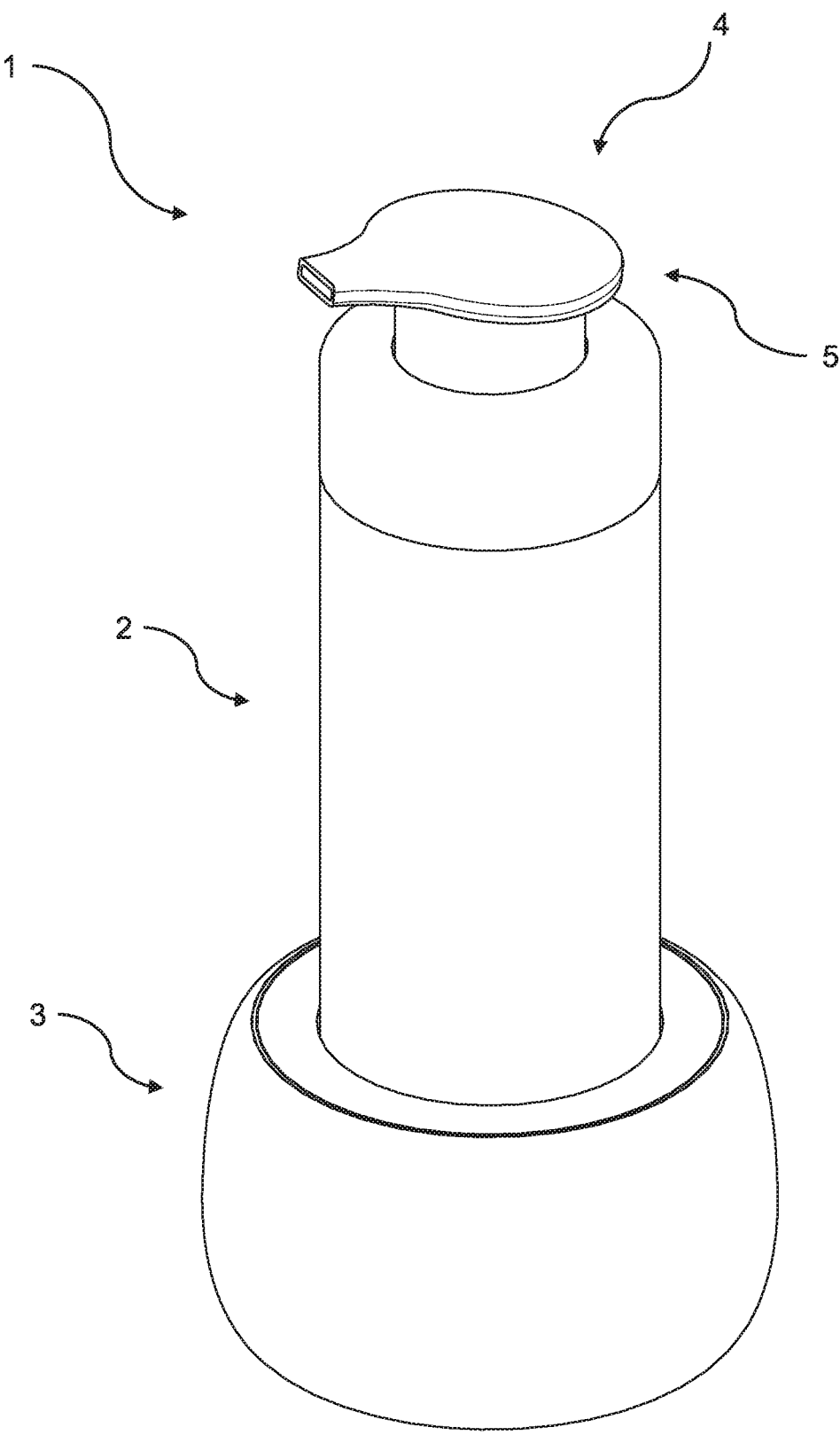
FIG. 1 is a perspective view, with parts removed for clarity, of a preparation assembly made in accordance with an embodiment of the present invention.

With reference to FIG. 1, the number 1 indicates overall a portable preparation assembly to prepare liquid cosmetic/cleanser products in a personalised manner.

In particular, the preparation assembly 1 is used to prepare liquid cleaning solutions such as, for example, shampoos, conditioners, liquid body soaps, liquid hand soaps, washing-up liquids, without limiting the wide range of possible applications of the present invention.

The preparation assembly 1 comprises a container 2, which is configured to contain a solvent liquid; a base 3, which is coupled to the container 2; and a cap 4, which is configured to couple with the container 2 and comprises a dispensing system 5, which is configured to convey the liquid cosmetic/cleanser product from the inside of the container 2 to the outside of the container 2.

Figure 2:
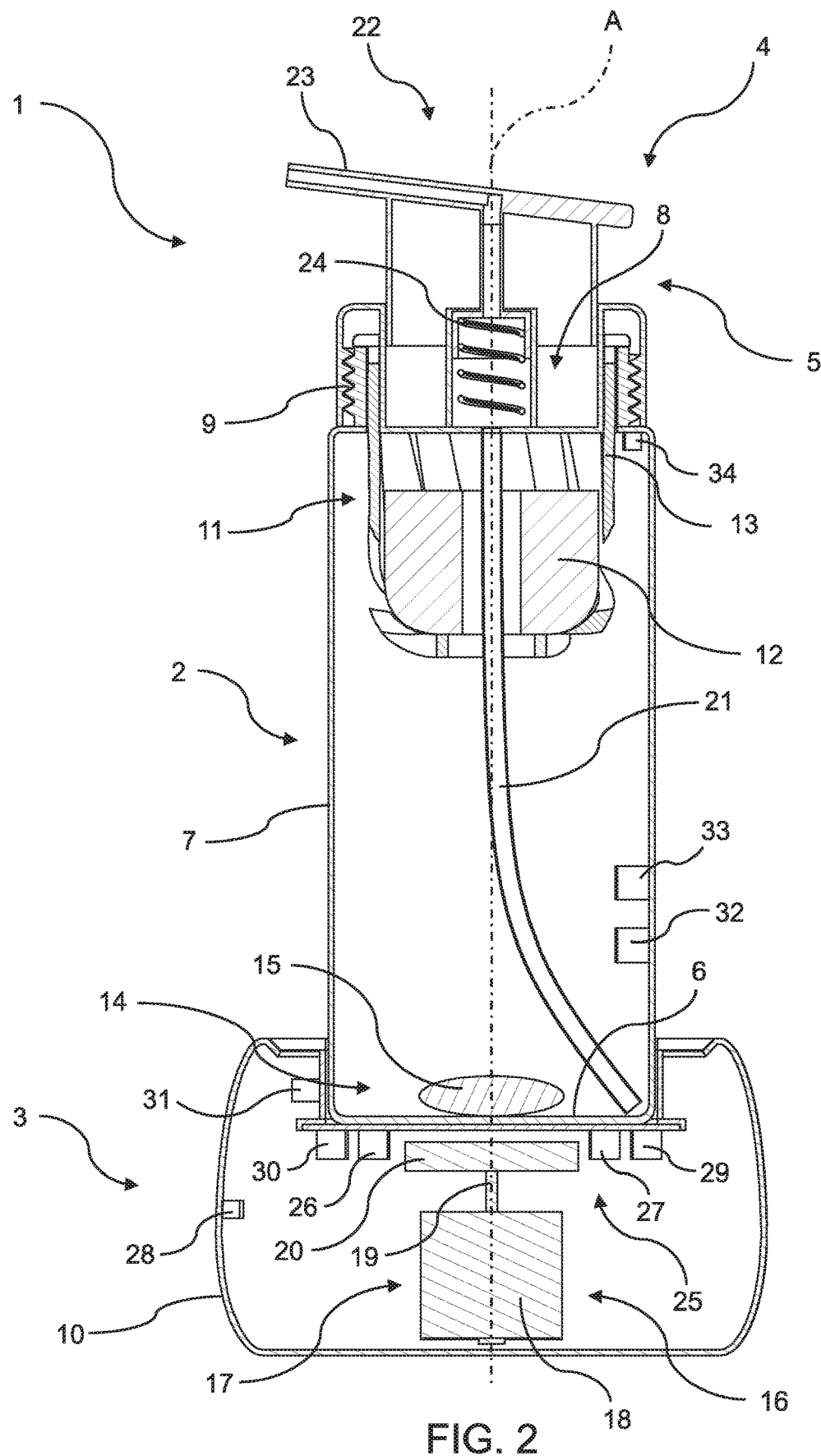
FIG. 2 is a sectional view, with parts removed for clarity, of the preparation assembly of FIG. 1.

With reference to FIG. 2, the container 2 extends along a longitudinal axis A and comprises a base wall 6, a lateral wall 7, and an upper opening 8 opposite to the base wall 6.

The upper portion of the lateral wall 7 is provided with a threading 9, which allows screw-coupling with the cap 4, so as to selectively open/close the upper opening 8 of the container 2.

In the non-limiting case described and illustrated here, the container 2 has a substantially cylindrical shape.

The base 3 comprises a casing 10, which is configured to couple with the base wall 6 of the container 2. In the case illustrated, the casing 10 is coupled in a releasable manner to the container 2 so that the container 2 can be removed from the base 3 if necessary.

The preparation assembly 1 further comprises a housing seat 11 for a solid cosmetic/cleanser 12 arranged at least partially inside the container 2.

In particular, the housing seat 11 is configured to house the solid cosmetic/cleanser 12 so that, in use, the solid cosmetic/cleanser 12 is at least partially immersed in the solvent liquid.

In further detail, the housing seat 11 is defined by a support grid 13, which is coupled to one of the walls 6, 7 of the container 2 near the upper opening 8 of the container 2. In the case described and illustrated here, the support grid 13 is coupled with an edge of the lateral wall 7 at the upper opening 8 of the container 2.

In particular, the support grid 13 is shaped in order to direct the flow of the solvent liquid towards the solid cosmetic/cleanser 12 when, in use, the solvent liquid contained in the container 2 is stirred.

In accordance with a variation of the present invention, not shown in the attached Figures, the support grid 13 is coupled to the base wall 6 of the container 2.

Furthermore, the preparation assembly 1 comprises a stirring device 14, which can be coupled to the container 2 and is configured to stir the solvent liquid contained in the container 2 so as to determine at least the partial dissolution of the solid cosmetic/cleanser 12 in the solvent liquid and mix the dissolved solid cosmetic/cleanser 12 with the solvent liquid to obtain the liquid cosmetic/cleanser product.

In particular, the stirring device 14 comprises a stirring element 15 housed in the container 2, and a moving assembly 16 configured to move the stirring element 15.

In the case described and illustrated here, the stirring element 15 is mobile inside the container 2.

The moving assembly 16 is contained inside the casing 10 and comprises a magnetic actuator 17 configured to implement rotation of the stirring element 15. In this way, the magnetic actuator 17 is not mechanically connected with the stirring element 15 inside the container 2, thus allowing easy decoupling of the container 2 from the base 3.

In particular the magnetic actuator 17 comprises a motor 18, preferably electric, having a shaft 19; and a magnet 20 fixed to the shaft 19 so that the motor 18 actuates rotation of the magnet 20. The stirring element 15 is made at least partially of ferromagnetic material, so that the magnetic actuator 17 determines, in use, rotation of the stirring element 15.

In accordance with a variation of the present invention, not shown in the attached Figures, the stirring device 14 comprises a magnetic stator, which is configured to generate a rotating magnetic field so as to determine rotation of the stirring element 15 made at least partially of magnetic material.

The dispensing system 5 is inserted in the upper opening 8 and can be selectively coupled to the upper portion of the lateral wall 7 of the container 2 due to the threading 9.

In particular, the dispensing system 4 comprises a feeding tube 21 which is arranged, in use, inside the container 2, and a dispensing element 22, which is arranged at least partially outside the container 2 and is fluidically connected to the feeding tube 21 so as to dispense the liquid cosmetic/cleanser product outside the container 2 through the feeding tube 21.

In further detail, the dispensing element 22 is mobile in an alternating manner in a direction substantially parallel to the longitudinal axis A and comprises a dispensing portion 23, which is arranged on the outside of the container 2 and has the shape of a spout.

The feeding tube 21 is shaped so as to homogenise the liquid cosmetic/cleanser product when, in use, the liquid cosmetic/cleanser product passes through the feeding tube 21.

The dispensing system 4 further comprises an elastic element 24, configured to supply a counter force to the movement of the dispensing element 22 in the direction substantially parallel to the longitudinal axis A.

Said alternating movement of the dispensing element 22 determines suction of the liquid cosmetic/cleanser product contained in the container 2 through the feeding tube 21.

Furthermore, the preparation assembly 1 comprises a heat exchange system 25, which is configured to exchange heat with the liquid cosmetic/cleanser product inside the container 2.

In particular, the heat exchange system 25 comprises a heating element 26 such as, for example, an electric resistance, which is contained inside the casing 10 and is configured to heat the base wall 6 of the container 2; and a cooling system 27, which is contained in the casing 10 and comprises a fan, not shown in the attached Figures.

Alternatively, the heat exchange system 25 can comprise an induction heating element 26.

In accordance with alternative embodiments, not shown in the attached Figures, the heating element 26 can be fixed to the container 2, in particular to the base wall 6, or can be arranged inside the container 2, or can be coupled to the support grid 13.

In accordance with further embodiments, not shown in the attached Figures, the cooling system 27 can comprise cooling fins fixed to the base wall 6 or a water cooling circuit or a tray for containing ice or a Peltier cell.

The preparation assembly 1 further comprises a control device 28, which is configured to control the stirring device 14; and at least one sensor 29, 30, 31, 32, 33, 34 configured to detect at least one operating parameter of the preparation assembly 1 and/or one or more chemical-physical properties of the liquid cosmetic/cleanser product.

In particular, the control device 28 is configured to receive the operating parameters of the preparation assembly 1 and/or the chemical-physical properties of the liquid cosmetic/cleanser product detected by the at least one sensor 29, 30, 31, 32, 33, 34 and to control the stirring device 14 and/or the heat exchange system 25 as a function of said parameters and/or said chemical-physical properties.

In particular, the at least one sensor comprises a temperature sensor 29, which is configured to measure the temperature of the liquid cosmetic/cleanser product; a weight sensor 30, which is configured to measure the weight of the liquid cosmetic/cleanser product and of the solid cosmetic/cleanser 12; a positioning sensor 31, which is configured to control the correct positioning between the stirring device 14 and the container 2; a pH sensor 32, which is configured to measure the pH of the liquid cosmetic/cleanser product; a viscosity sensor 33, which is configured to measure the viscosity of the liquid cosmetic/cleanser product; and a closure sensor 34, which is configured to control the correct positioning between the container 2 and the cap 4.

In the non-limiting case of the present invention described and illustrated here, the temperature sensor 29, the weight sensor 30 and the control sensor 31 are coupled to the base 3. The pH sensor 32, the viscosity sensor 33, and the closure sensor 34 are coupled to the container 2 or to the cap 4.

Figure 3:
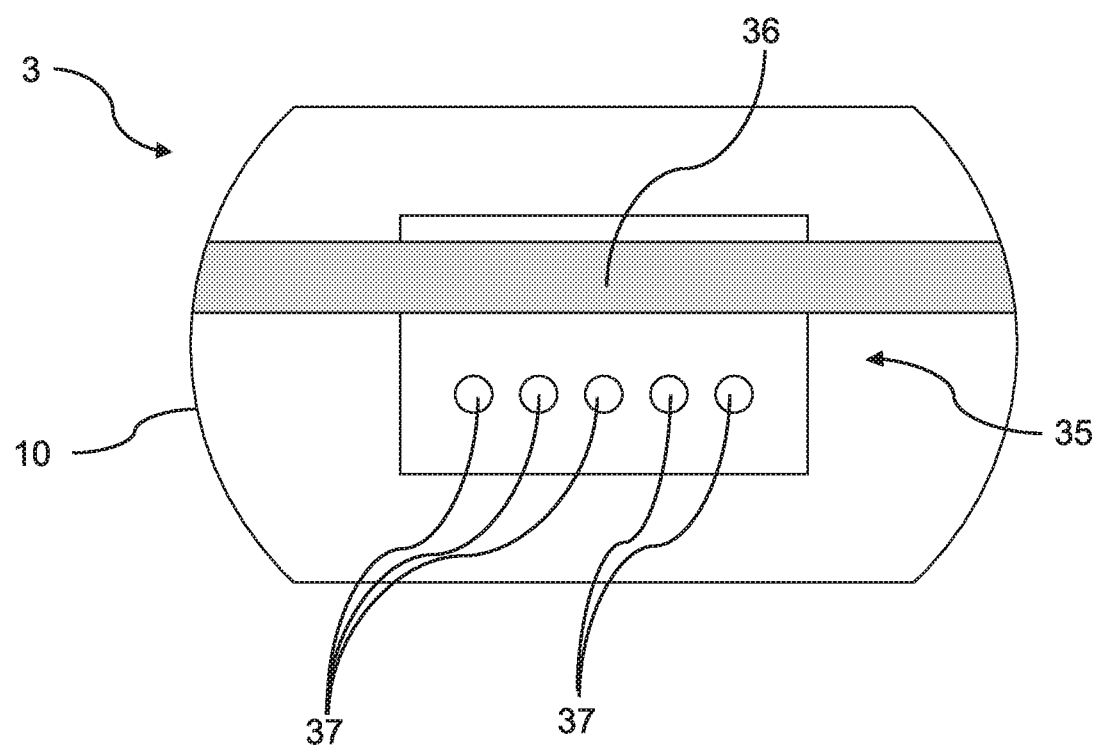
FIG. 3 is a lateral elevation view, with parts removed for clarity, of a detail of the preparation assembly of FIG. 1.

With reference to FIG. 3, the preparation assembly 1 comprises a user interface 35, which is configured to receive commands for control of the stirring device 14 and/or the heat exchange system 25 and to transmit said commands to the control device 28.

Furthermore, the user interface 35 is configured to provide data indicative of the operating parameters of the preparation assembly 1, for example time parameters of the preparation cycle, and/or chemical-physical properties of the liquid cosmetic/cleanser product detected by the at least one sensor 29, 30, 31, 32, 33, 34.

In particular, the user interface 35 is coupled with the casing 9 of the base 3 and comprises a lighting device 36 and control buttons 37.

Furthermore, the user interface 35 can comprise a bar code reader, not shown in the attached Figures, to identify a preparation cycle recommended for a given solid cosmetic/cleanser, and is configured for wireless communication with a portable electronic device such as, for example, a smartphone or a tablet or a smartwatch, allowing the user to select a recommended preparation cycle.

Figure 4:
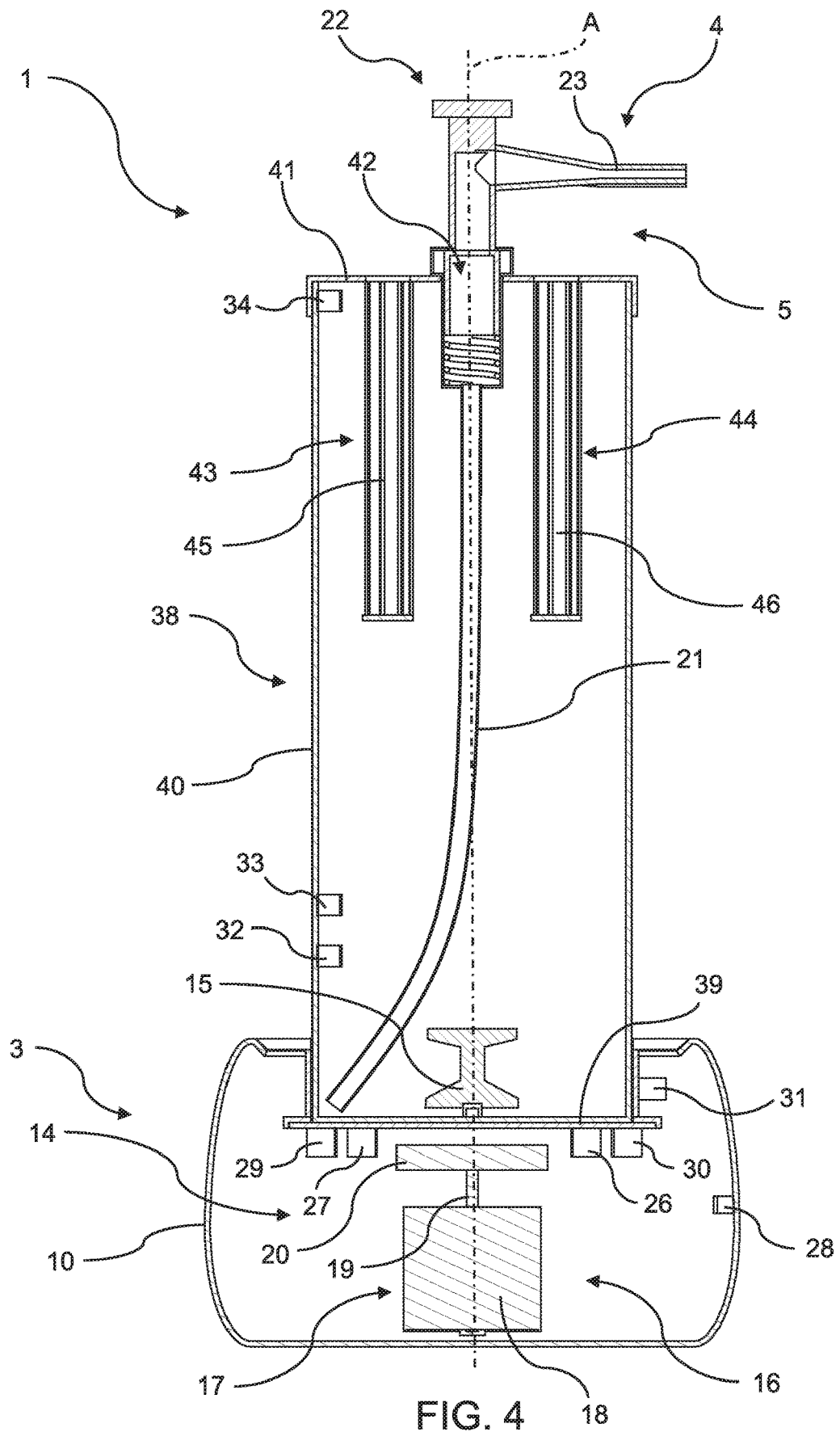
FIGS. 4-9 are sectional views, with parts removed for clarity, of further embodiments of the preparation assembly of FIG. 1.

With reference to FIG. 4, a second embodiment of the present invention is shown, in which the preparation assembly 1 comprises a container 38 provided with a base wall 39, a lateral wall 40, an upper wall 41 coupled with the lateral wall 40 and opposite to the base wall 39, and an upper opening 42 obtained in the upper wall 41.

Furthermore, the preparation assembly 1 comprises a housing seat 43, which is configured to house a solid cosmetic/cleanser, not shown in the attached Figures, has an elongated shape, and is arranged at least partially inside the container 38; and a housing seat 44, which is configured to contain an additive component of the liquid cosmetic/cleanser product.

In further detail, the housing seats 43 and 44 are defined by respective support grids 45 and 46, each of which is fixed to the upper wall 41.

In accordance with a variation of the present embodiment, not shown in the attached Figures, the upper wall 41 is coupled with the lateral wall 40 in a releasable manner. The support grid 45 is coupled with the face of the upper wall 41 facing the base wall 39 and has a lateral opening for the lateral insertion of the solid cosmetic/cleanser.

In accordance with an alternative embodiment, not shown in the attached Figures, the housing seat 44 is obtained in the cap 4 or in the container 38, in use is kept separate from the solvent liquid and/or from the liquid cosmetic/cleanser product, and is configured to release as required the additive component into the solvent liquid and/or into the liquid cosmetic/cleanser product.

In accordance with a further variation of the present embodiment, not shown in the attached Figures, the housing seat 44 is mobile and is configured to be gradually immersed in the solvent liquid contained in the container 38.

Furthermore, in the case described and illustrated here, the stirring element 15 is coupled in a rotating manner to the base wall 39 of the container 38.

Figure 5:
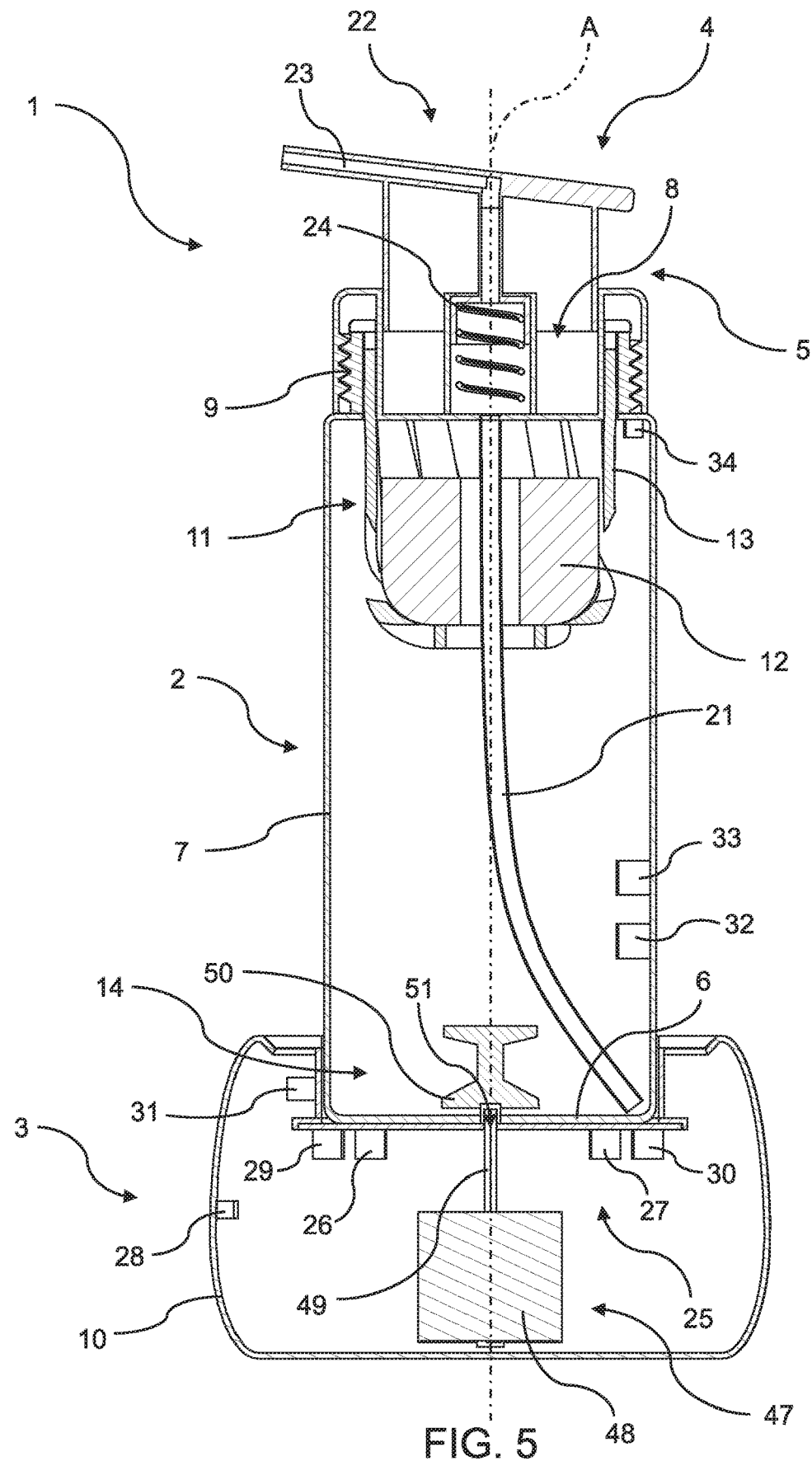

With reference to FIG. 5, a third embodiment of the present invention is shown, in which the stirring device 14 comprises a moving assembly 47, which comprises an electric actuator 48 provided with a shaft 49 connected to the stirring element 50 to implement rotation of the stirring element 50.

In other words, the shaft 49 is inserted in an opening 51 of the base wall 6 of the container 2.

In accordance with a variation of the present embodiment, not shown in the attached Figures, the stirring device is of the homogeniser probe type and comprises a stirring element provided with fixed portions and mobile portions.

Figure 6:
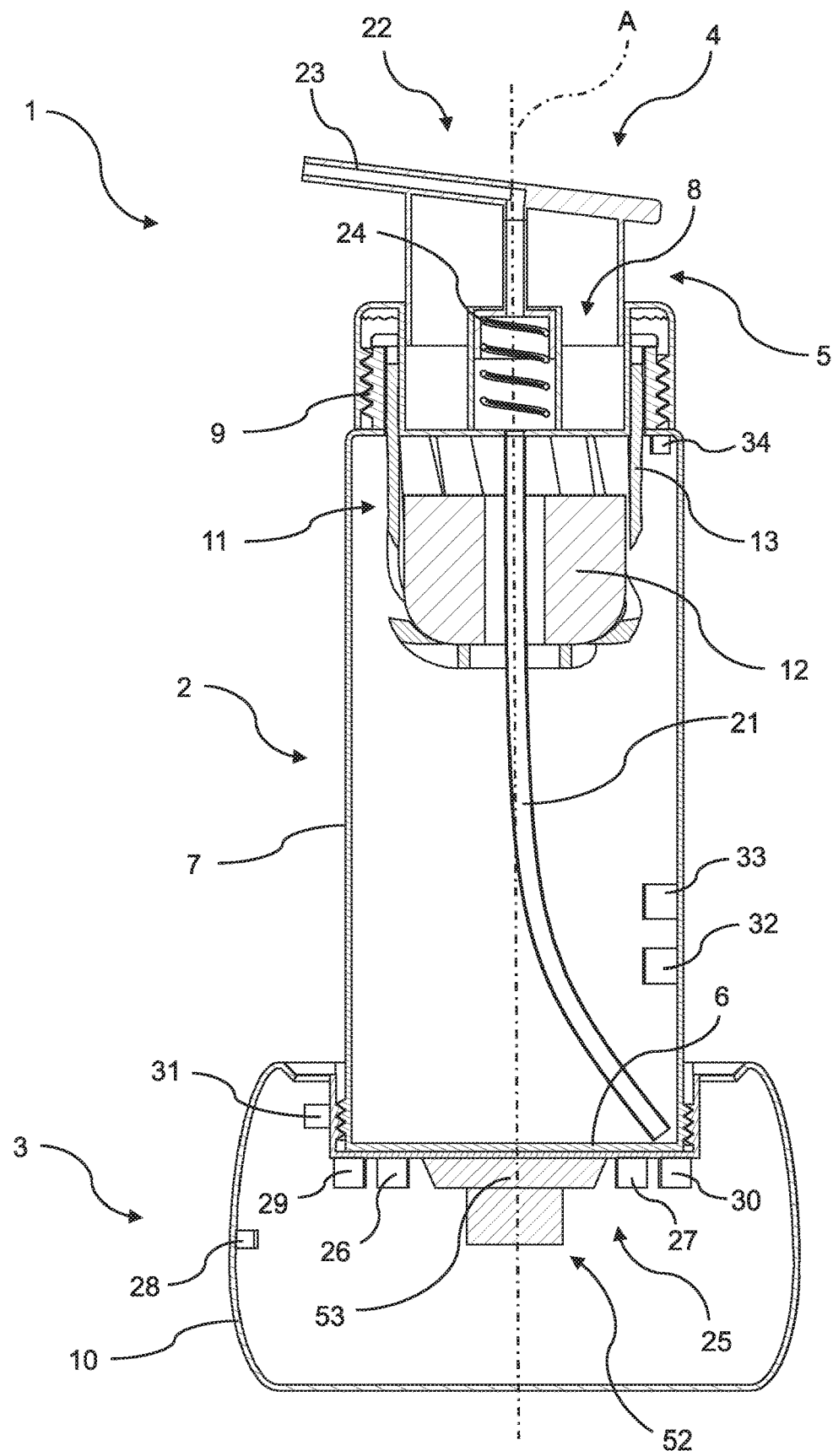

With reference to FIG. 6, a fourth embodiment of the present invention is shown, in which the preparation assembly 1 comprises a stirring device 52, which is arranged in the casing 10 at the base wall 6 and comprises an ultrasonic actuator 53 configured to determine cavitation of the solvent liquid.

In said configuration, the preparation assembly 1 is not provided with the stirring element 15 and the container 2 can be made of a sound-deadening material.

Figure 7:
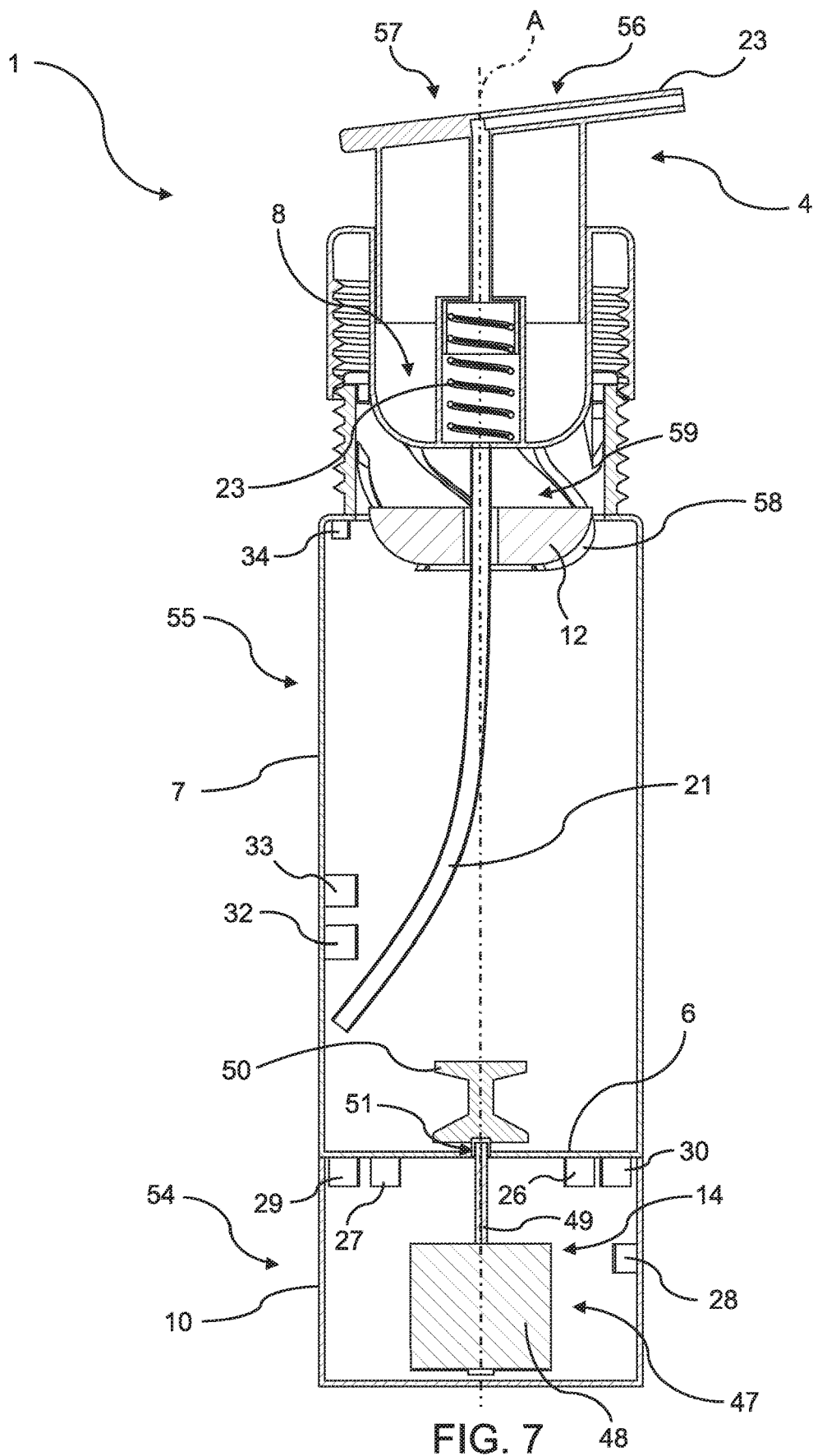

With reference to FIG. 7, a fifth embodiment of the present invention is shown, in which the preparation assembly 1 comprises a base 54 and a container 55, which is fixed permanently to the base 54.

Furthermore, the preparation assembly 1 comprises a dispensing system 56, which is provided with a dispensing element 57 mobile in a direction substantially parallel to the longitudinal axis A so as to press the solid cosmetic/cleanser 12 against the support grid 58 of the housing seat 59 determining cutting of the solid cosmetic/cleanser 12. In this configuration, the cap 4 is slidingly coupled to the support grid 58, and the support grid 58 is shaped to allow cutting of the solid cosmetic/cleanser 12.

Figure 8:
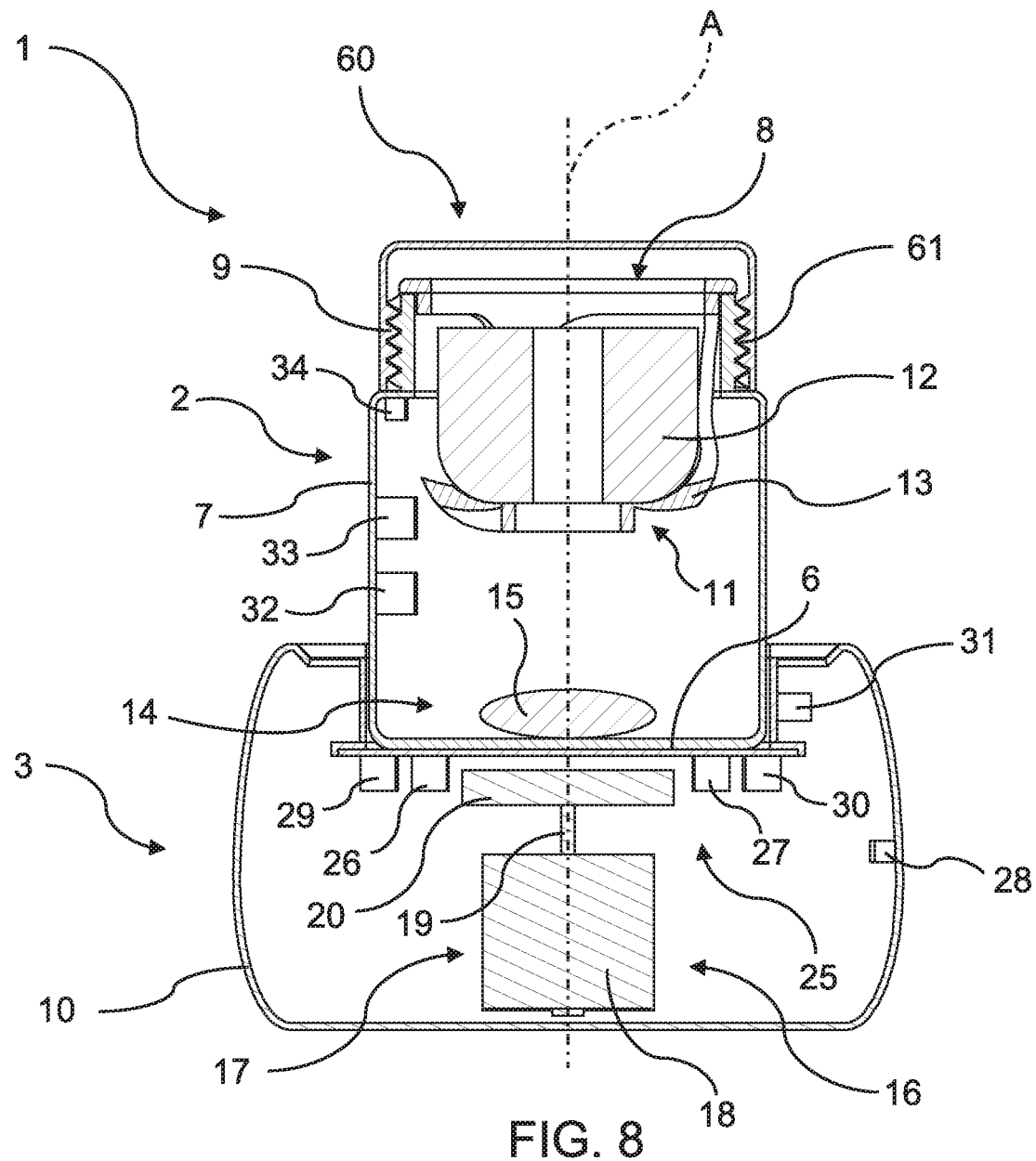

With reference to FIG. 8, a sixth embodiment of the present invention is shown, in which the preparation assembly 1 comprises a cap 60, which is not provided with the dispensing system 5 and is configured to couple with the container 2 so as to selectively open/close the upper opening 7 of the container 2.

In further detail, the cap 60 comprises a threading 61, which is shaped to couple with the threading 9 of the upper portion of the lateral wall 7.

Figure 9:
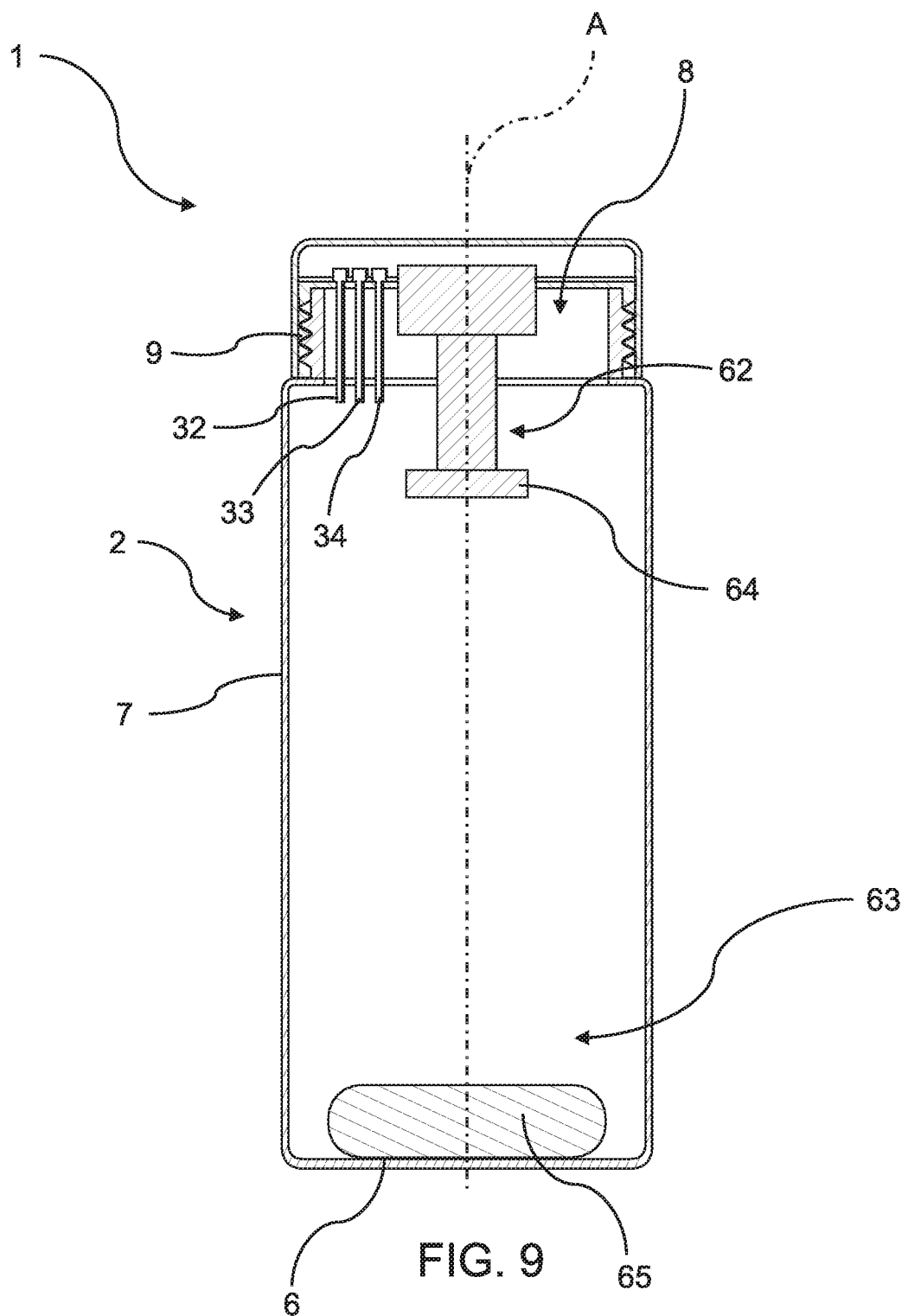

With reference to FIG. 9, a seventh embodiment of the present invention is shown, in which the preparation assembly 1 comprises a stirring device 62 which, in use, is inserted in the container 2 through the upper opening 8.

In this configuration, the preparation assembly 1 is not provided with the base 3 and the stirring element 15, and comprises a housing seat 63, which is defined by a bottom portion of the container 2 delimited by the base wall 6 and by the lateral wall 7 of the container 2 and is configured to house a solid cosmetic/cleanser 65.

In the case described and illustrated here, the stirring device 62 comprises a further ultrasonic actuator 64, which is configured to determine cavitation of the solvent liquid.

In accordance with a variation of the seventh embodiment, not shown in the attached Figures, the stirring device 62 comprises a rotating element and an actuator, which is configured to implement rotation of the rotating element.

In use and with reference to FIG. 2, the user removes the cap 4 from the container 2 and fills the container 2 with a given quantity of solvent liquid.

Subsequently, the user houses the solid cosmetic/cleanser 12 in the housing seat 11 and couples the cap 4 to the container 2, screwing the cap 4 onto the threading 9 of the upper portion of the lateral wall 7.

After the container 2 has been coupled to the base 3, the user controls the motor 18 of the magnetic actuator 17 by means of the user interface 35 (FIG. 3) so as to determine rotation of the stirring element 15.

The rotary motion of the stirring element 15 produces a vortex current in the solvent liquid, determining dissolution of the solid cosmetic/cleanser 12 in the solvent liquid and mixing the solid cosmetic/cleanser 12 dissolved with the solvent liquid to obtain the liquid cosmetic/cleanser product.

If necessary, the heat exchange system 25 is activated to selectively heat or cool the liquid cosmetic/cleanser product through the base wall 6 of the container 2.

If necessary, an additive component is introduced into the container 2, said component being dissolved and mixed in the solvent liquid due to the current generated by the stirring device 14.

During the preparation cycle, the sensors 29, 30, 31, 32, 33 and 34 measure the operating parameters of the preparation assembly 1 and/or the chemical-physical properties of the liquid cosmetic/cleanser product. Said operating parameters and said chemical-physical properties are displayed on the screen 36 of the user interface 35 (FIG. 3).

Once the preparation cycle has been completed, the magnetic actuator 17 is deactivated and the user pushes the dispensing element 22 towards the container 2, sucking from the inside of the container 2 the liquid cosmetic/cleanser product, which is dispensed from the dispensing portion 23 of the dispensing element 22.

Lastly, it is evident that variations can be made to the present invention with respect to the embodiments described without departing from the scope of the attached claims.

What is claimed is:

1. A portable preparation assembly to prepare liquid cosmetic/cleanser products in a personalised way, the preparation assembly comprising:
    a container, which is configured to contain a solvent liquid that comprises a base wall, a lateral wall, and an upper opening opposite to the base wall;
    a housing seat configured to house a solid cosmetic/cleanser and arranged at least partially inside the container;
    a stirring device, which is configured to stir the solvent liquid in the container so as to determine at least the partial dissolution of the solid cosmetic/cleanser in the solvent liquid and to mix the dissolved solid cosmetic/cleanser with the solvent liquid to obtain the liquid cosmetic/cleanser product;
    wherein the stirring device comprises a stirring element housed in the container and a moving assembly configured to move the stirring element;
    wherein the stirring device is mobile inside the container; and
    wherein the moving assembly comprises a magnetic actuator and the stirring element is made of ferromagnetic material, so that the magnetic actuator determines, in use, the rotation of the stirring element.

2. The preparation assembly as claimed in claim 1 wherein the moving assembly is outside the container.

3. The preparation assembly as claimed in claim 2, wherein the moving assembly is contained within a casing, which is configured to couple with the container.

4. The preparation assembly as claimed in claim 3, wherein the casing is configured to couple in a releasable way to the container.

5. The preparation assembly as claimed in claim 1, wherein the stirring device is, in use, inserted into the container through the upper opening.

6. The preparation assembly as claimed in claim 1, wherein the stirring element is coupled in rotating manner to a wall of the container.

7. The preparation assembly as claimed in claim 1, wherein the moving assembly comprises an electric actuator equipped with a rotating shaft, which is connected to the stirring element in order to actuate a rotation of the stirring element.

8. The preparation assembly as claimed in claim 1, wherein the stirring device comprises an ultrasonic actuator, which is configured to determine the cavitation of the solvent liquid in the container.

9. The preparation assembly as claimed in claim 1, wherein the housing seat is defined by a bottom portion of the container delimited by the base wall and the lateral wall of the container.

10. The preparation assembly as claimed in claim 1, further comprising at least one further housing seat, which is at least partially arranged inside the container and is configured to contain an additive component of the liquid cosmetic/cleanser product.

11. The preparation assembly as claimed in claim 1, further comprising a cap configured to couple with the container so as to selectively open/close the upper opening of the container.

12. The preparation assembly as claimed in claim 11, wherein the cap is equipped with a dispensing system, which is configured to selectively dispense the liquid cosmetic/cleanser product from inside the container to the outside of the container.

13. The preparation assembly as claimed in claim 12, wherein the dispensing system comprises a feeding tube which is arranged, in use, inside the container, and a dispensing element which is arranged at least partially outside the container and is fluidically connected to the feeding tube so that the liquid cosmetic/cleanser product is dispensed outside the container through the feeding tube.

14. The preparation assembly as claimed in claim 1, and comprising a heat exchange system, which is configured to exchange heat with the liquid cosmetic/cleanser product inside the container.

15. A portable preparation assembly to prepare liquid cosmetic/cleanser products in a personalised way, the preparation assembly comprising:
    a container, which is configured to contain a solvent liquid that comprises a base wall, a lateral wall, and an upper opening opposite to the base wall;
    a housing seat configured to house a solid cosmetic/cleanser and arranged at least partially inside the container;
    a stirring device, which is configured to stir the solvent liquid in the container so as to determine at least the partial dissolution of the solid cosmetic/cleanser in the solvent liquid and to mix the dissolved solid cosmetic/cleanser with the solvent liquid to obtain the liquid cosmetic/cleanser product; and
    a control device, which is configured to control the stirring device; and a user interface, which is configured to receive commands to control the stirring device and to transmit said commands to the control device; wherein the user interface is coupled to the casing; and
    at least one sensor, configured to detect at least one operating parameter of the preparation assembly and/or one or more chemical-physical properties of the liquid cosmetic/cleanser product.

16. The preparation assembly as claimed in claim 15, wherein at least one sensor comprises a temperature sensor, which is configured to measure the temperature of the liquid cosmetic/cleanser product; and/or a weight sensor, which is configured to measure the weight of the liquid cosmetic/cleanser product and of the solid cosmetic/cleanser; and/or a positioning sensor, which is configured to check the correct positioning between the stirring device and the container; and/or a pH sensor, which is configured to measure the pH of the liquid cosmetic/cleanser product; and/or a viscosity sensor, which is configured to measure the viscosity of the liquid cosmetic/cleanser product; and/or a closure sensor, which is configured to check the correct positioning between the container and the cap.

17. The preparation assembly as claimed in claim 15, wherein the user interface is configured to provide data indicative of at least one operating parameter of the preparation assembly and/or at least one chemical-physical property of the liquid cosmetic/cleanser product detected by at least one sensor.

* * * * *